United States Patent
Heppe et al.

(10) Patent No.: US 11,033,996 B2
(45) Date of Patent: *Jun. 15, 2021

(54) ROTARY INDEXING TABLE AND METHOD FOR TRANSPORTING OBJECTS

(71) Applicant: FRESENIUS MEDICAL CARE DEUTSCHLAND GMBH, Bad Homburg (DE)

(72) Inventors: John Heppe, St. Wendel (DE); Pascal Joachimsky, Schmelz (DE); Franz Kugelmann, St. Wendel (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 413 days.

This patent is subject to a terminal disclaimer.

(21) Appl. No.: 16/090,923

(22) PCT Filed: Apr. 10, 2017

(86) PCT No.: PCT/EP2017/058583
§ 371 (c)(1),
(2) Date: Oct. 3, 2018

(87) PCT Pub. No.: WO2017/178442
PCT Pub. Date: Oct. 19, 2017

(65) Prior Publication Data
US 2019/0105749 A1    Apr. 11, 2019

(30) Foreign Application Priority Data

Apr. 13, 2016   (DE) .................... 10 2016 004 335.0

(51) Int. Cl.
*B23Q 16/10* (2006.01)
*B65B 43/50* (2006.01)
(Continued)

(52) U.S. Cl.
CPC .............. *B23Q 16/10* (2013.01); *B65B 3/003* (2013.01); *B65B 3/04* (2013.01); *B65B 43/50* (2013.01);
(Continued)

(58) Field of Classification Search
CPC ........ B23Q 16/02; B23Q 16/06; B23Q 16/10; B23Q 16/102; B23Q 1/25; B23Q 1/50;
(Continued)

(56) References Cited

U.S. PATENT DOCUMENTS

| 3,647,043 | A | * | 3/1972 | Garetto | ................ | B23Q 39/042 |
| | | | | | | 198/345.3 |
| 3,949,859 | A | * | 4/1976 | Nussbaumer | ........ | B65G 17/002 |
| | | | | | | 198/345.3 |
| 2012/0090954 | A1 | * | 4/2012 | Krauss | ................... | B65G 29/00 |
| | | | | | | 198/339.1 |

FOREIGN PATENT DOCUMENTS

CH    566249 A5    9/1975
CN    102530502 A    7/2012
(Continued)

OTHER PUBLICATIONS

JP H0812064 Machine Translation (Year: 1996).*
(Continued)

*Primary Examiner* — Monica S Carter
*Assistant Examiner* — Alberto Saenz
(74) *Attorney, Agent, or Firm* — Kilyk & Bowersox, P.L.L.C.

(57) ABSTRACT

A transport device is provided for transporting objects from work station to work station. A production facility for producing products is also described. The transport device has an object carrier on which a plurality of object carrier elements are arranged for placing down objects, and a drive unit for driving the object carrier. The object carrier can be
(Continued)

moved in successive cycles such that the object carrier elements can be transported on a movement path from work station to work station. At least one object carrier element on the object carrier is displaceable relative to the object carrier in the movement path. The transport device has a dog element and a retaining element that are assigned to the object carrier element. The carrier element is carried along by the object carrier and moved from work station to work station or the carrier element remains at a work station.

11 Claims, 6 Drawing Sheets

(51) Int. Cl.
| | | |
|---|---|---|
| *B65B 3/00* | (2006.01) | |
| *B65B 3/04* | (2006.01) | |
| *B65G 47/80* | (2006.01) | |
| *B65G 29/00* | (2006.01) | |
| *B67C 3/00* | (2006.01) | |
| *B65G 47/51* | (2006.01) | |

(52) U.S. Cl.
CPC ......... *B65G 29/00* (2013.01); *B65G 47/5177* (2013.01); *B65G 47/80* (2013.01); *B67C 3/00* (2013.01); *B23Q 2220/004* (2013.01)

(58) Field of Classification Search
CPC ... B23Q 1/52; B23Q 3/02; B23Q 3/06; B23Q 3/061; B23Q 3/105; B23Q 2220/004; B25B 1/2457; B25B 5/16; B25B 11/00; B65B 3/003; B65B 3/04; B65B 43/50

USPC ............ 269/45, 54.3, 55, 56, 57, 63, 71, 73
See application file for complete search history.

(56) References Cited

FOREIGN PATENT DOCUMENTS

| JP | H0812064 A | 1/1996 |
| JP | 2010013134 A | 1/2010 |
| WO | 2011000603 A1 | 1/2011 |
| WO | 2014090462 A1 | 6/2014 |

OTHER PUBLICATIONS

International Search Report issued in corresponding International Patent Application No. PCT/EP2017/058583 (with English translation) dated Jul. 19, 2017 (5 pages).
International Preliminary Report on Patentability issued in corresponding International Patent Application No. PCT/EP2017/058583 dated Oct. 16, 2018 (7 pages).
Office Action issued in corresponding Japanese Patent Application No. 2018-553983 dated Dec. 22, 2020 (with English translation)(9 pages).
Office Action issued in corresponding Chinese Patent Application No. 201780023487.7 dated Oct. 22, 2020 (with English translation)(22 pages).
Office Action issued in corresponding Chinese Patent Application No. 201780023487.7 dated Mar. 15, 2021 (English translation only)(5 pages).

* cited by examiner

ROTARY INDEXING TABLE AND METHOD FOR TRANSPORTING OBJECTS

This application is a National Stage Application of PCT/EP2017/058583, filed Apr. 10, 2017, which claims priority to German Patent Application No. 10 2016 004 335.0, filed Apr. 13, 2016.

The invention relates to a transport device for transporting objects from work station to work station of a production facility. The transport device has an object carrier on which a plurality of object carrier elements are arranged for placing down one or more objects, and a drive unit for driving the object carrier. The object carrier can be moved in successive cycles in such a way that the object carrier elements can be transported on a movement path from work station to work station. The invention further relates to a production facility for producing products, comprising a transport device of this type, in particular to a production facility for producing containers filled with a medical product, e.g. a medicine. Furthermore, the invention relates to a method for transporting objects from work station to work station of a production facility, in particular to a method for producing containers filled with a medical product.

In production facilities for producing products, rotary tables, which are also referred to as rotating work tables or rotary indexing tables, are used for transporting the products from work station to work station. The known rotary indexing tables comprise a circular object carrier that can turn about a vertical axis. The object carrier is driven by a drive unit. During production, the object carrier turns in steps in individual cycles either clockwise or anticlockwise.

The work stations are distributed circumferentially around the object carrier. The objects to be processed are positioned on the object carrier in a manner distributed circumferentially. As a result of the object carrier turning, the objects can be transported from work station to work station. The work stations each perform a work process on the objects, which process may include one or more production steps. The objects can be arranged on the object carrier in object carrier elements which receive one or more objects. The objects can be products to be produced (goods) or workpieces to be machined.

The known rotary indexing tables have an object carrier on which the object carrier elements are arranged immovably relative to one another. They are secured circumferentially on the object carrier at predefined distances. In conjunction with the stationary work stations, the object carrier elements are moved into the appropriate position opposite each work station purely by the object carrier turning. The object carrier elements have to remain at the stations until the work station has completed the work process.

Production facilities generally have work stations having different process times. In the process, the step-by-step turning of the object carrier is substantially defined by the duration of the longest process. Since the object carrier remains still during a work process having a long processing time, and owing to the predefined distances between the object carrier elements and the step-by-step turning of the object carrier through a predefined angle of rotation, a separate work station is required for processing each object, even for the work processes having the short process times. However, this work station is only in use for a short time, which entails high investment and running costs and is inefficient. Moreover, as the number of work stations increases, so too does the likelihood that the production facility will break down. Production facilities of this type are characterised by high complexity and a lack of access to the components.

In addition to the permanently linked object carriers, the prior art also discloses modular object carriers, in which the object carrier elements are driven by means of separate motors that can be controlled separately from one other. Systems of this type are, however, very complex and require lots of maintenance.

An object of the invention is to provide a transport device for transporting objects from work station to work station of a production facility that has a relatively simple construction and allows the production process to have a flexible design. Another object of the invention is to create a production facility for producing products that has a relatively simple construction and allows the production process to have a flexible design. The object of the invention is also to disclose a method that allows objects to be transported from work station to work station in a flexible manner. More particularly, the object of the invention is to disclose a flexible method for producing containers filled with a medical product.

These objects are achieved according to the invention by the features of the independent claims. The dependent claims relate to advantageous embodiments of the invention.

The transport device according to the invention and method according to the invention allow the production process to be designed flexibly using a conventional, freely programmable controller. The advantages of the apparatus according to the invention and of the method according to the invention are particularly apparent when the production includes production processes having different process times.

The transport device according to the invention for transporting objects from work station to work station of a production facility has an object carrier on which a plurality of object carrier elements is arranged. Object carrier elements are understood to be any element on which one or more objects can be set down or arranged. The objects can be loose on the object carrier elements or fixed in place on the object carrier elements. The object carrier can be moved in successive cycles in such a way that the object carrier elements can be transported from work station to work station on a movement path. The movement path can be a linear path or a circular path. As a result, the object carrier can perform a linear movement or turn about an axis. A drive unit is provided for driving the object carrier for the linear movement or the turning. However, the invention is not limited to circular paths or linear paths. According to the invention, paths other than a circular path or linear path are also possible.

The transport device according to the invention is characterised in that at least one object carrier element of the plurality of object carrier elements on the object carrier is arranged to be displaceable relative to the object carrier in the direction of the movement path on which the carrier elements can be transported from work station to work station. As a result, the object carrier and the object carrier elements do not form a rigid arrangement. The object carrier elements are freely displaceable on the object carrier and do not have their own drives.

In addition, the transport device according to the invention is characterised in that a dog element and a retaining element are assigned to the at least one object carrier element. The dog element assigned to the object carrier element and the retaining element assigned to the same object carrier element cannot or may not be active at the same time in any operating state. While the dog element moves together with the object carrier, the retaining element is stationary. The dog element can assume an active state, in which relative movement between the object carrier element and object carrier is prevented, and an inactive state, in which relative movement between the object carrier element and object carrier is permitted. The dog element can be moved or switched between these two states. The retaining element can assume an active state, in which the object carrier element is held in place, and an inactive state, in which the object carrier element is released. The retaining element can be moved or switched between these two states. Since the retaining element is stationary, the object carrier element is not locked on the object carrier, but rather is held in place from the outside while the object carrier moves. The object carrier element can thus be held in place in relation to a fixed spatial coordinate system or can be released to move on or in the object carrier, the object carrier being able to move in the fixed spatial coordinate system, for example being able to turn about a central axis.

The at least one dog element and the at least one retaining element are actuated by means of an actuation unit. The actuation unit for the dog elements and the retaining elements can have actuating members, by which dog and retaining elements can be moved between the two positions. The actuation unit can for example be an electric motor drive and/or a pneumatic drive and/or a hydraulic drive.

The actuation unit is designed such that, in some cycles of the successive cycles, the dog element assumes an active state and the retaining element assumes an inactive state such that the object carrier element in question is carried along by the object carrier and moved from work station to work station. The actuation unit is also designed such that, in some cycles of the successive cycles, the dog element assumes an inactive state and the retaining element assumes an active state such that the object carrier element remains at a work station.

The actuation of the at least one dog element and retaining element by the actuation unit thus allows the object carrier to move in order to transport objects to a work station that has a short process time whilst an object carrier element remains at a work station having a long process time.

If the overall production process having a plurality of work processes has just one work process that has a long process time, it is sufficient in principle for just one object carrier element on the object carrier to be arranged to be displaceable relative to the object carrier in the direction of the movement path on which the object carrier elements can be transported from work station to work station. This object carrier element can then remain at the work station having the long process time. If there is just one object carrier element, only one dog element and retaining element is required. If there are two object carrier elements, for example, at least two dog elements and retaining elements are required if the two carrier elements are to be controlled independently of one another.

In a preferred embodiment of the transport device, all the object carrier elements can move freely on the object carrier, each object carrier element being assigned a dog element and a retaining element. As a result, all the object carrier elements can be controlled independently of one another. The dog and retaining elements can be actuated by a freely programmable controller. This means that the transport device can be used flexibly for different production processes.

In another preferred embodiment, the object carrier is a rotary indexing table comprising an object carrier which can turn about an axis of rotation. By means of the rotary indexing table, the objects can be transported from work station to work station on a circular path. In this embodiment, the object carrier elements are distributed circumferentially on a circular path.

To carry out the individual work processes, the individual object carrier elements that are displaceably arranged on the movement path must not be able to obstruct one another. Therefore, not all the movement path is occupied by object carrier elements. When the transport device is designed as a rotary indexing table, the object carrier elements are distributed circumferentially on a circular path in such a way that one segment of the circular path does not have one or more object carrier elements. As a result, the individual object carrier elements can be displaced relative to one another on the circular path at least within certain limits.

A particularly preferred embodiment provides a guide path in which the object carrier elements are guided so as to be freely movable in relation to the object carrier such that they can be held in place in relation to a fixed spatial coordinate system. The guide path can have various designs. The only important factor is that the object carrier elements can move only on the movement path. The guide path can for example be a circular or linear guide path.

To receive the objects, the object carrier elements preferably comprise receiving elements into or onto which the objects can be inserted or placed, respectively. Therefore, the objects are adequately fixed on the object carrier elements.

The catch elements and retaining elements can have various designs. The only important factor is that the object carrier elements can be fixed adequately. They can be fixed by an interlocking and/or frictional connection. The catch elements are preferably designed such that they establish an interlocking or frictional connection between a part of the object carrier element and a part of the object carrier, whereas the retaining elements are designed such that an interlocking or frictional connection is established between a part of the object carrier element and a stationary part. The stationary part can, for example, be a housing part of the transport device. What is crucial is that the retaining element engages with the object carrier element externally in relation to the fixed spatial coordinate system in which the object carrier turns, and the catch element engages with the object carrier element internally.

By means of the control of the drive unit of the object carrier and the actuation of the dog and retaining elements, the object carrier elements, together with the objects, are positioned in the desired processing position opposite each work station and can be moved on from one work station to another work station.

Since the object carrier elements do not have separate drives, the design of the transport device is simplified. The transport device can be produced using conventional assemblies. The use of standard machine parts reduces the maintenance requirements of the transport device. Any form of waiting areas can be set up for individual objects, and additional processes, e.g. object cleaning, can also be easily integrated in the production process since gaps can be created specifically at any position to integrate these processes. It is also possible to integrate inspection spaces.

The production facility according to the invention for producing products has one or more of the transport devices according to the invention. A plurality of work stations can be arranged along the movement path of the transport device. Each work station can be intended for carrying out a work process that includes at least one work step. The non-exhaustive list of possible examples of work steps may include: handling, feeding, removing, machining, thermal processing, filling, cleaning, fitting, weighing, labelling. The work stations can carry out a work process on one object or on a plurality of objects at the same time.

The transport device according to the invention can be used in different production facilities. In a particularly preferred embodiment, the transport device according to the invention is used in a production facility for producing containers filled with a medical product, in particular a medicine, and in particular is used in a production facility for producing medical solution bags, for example solution bags for peritoneal dialysis, acute haemodialysis or the infusion technique. Solution bags of this type are produced by bag blanks being provided with a connection piece, e.g. a "welded shuttle" having a port or a cover or a cap, and the bags provided with the connection piece being filled with a solution. In this case, the production step of filling the bag with the solution is the step having the longest process time.

The production facility according to the invention for producing containers filled with a medical product has one work station having a longer process time than the process times of the other work stations. The work station having the longer process time is the work station for filling the containers with the medical product, whereas the other work stations having the shorter process times are a work station for setting down unfilled containers that are to be provided with a connection piece, a work station for attaching the connection piece to the containers, and a work station for removing the containers that have been provided with the connection piece and filled with the medical product. However, the production process can include even more work stations, for example work stations for closing the connection pieces or work stations for applying product applications, e.g. stickers or labels.

While the containers in one object carrier element are being filled with the medical fluid, one or more other object carrier elements having one or more other containers can at the same time be positioned at another work station, as a result of which just one work station is required in each case for the other work processes, for example for fitting the connection pieces to the unfilled containers. This simplifies the construction of the overall production facility and reduces the likelihood that it will breakdown since the number of work stations is reduced.

Two embodiments of the invention will be described in detail below with reference to the drawings, in which.

Figure 1:
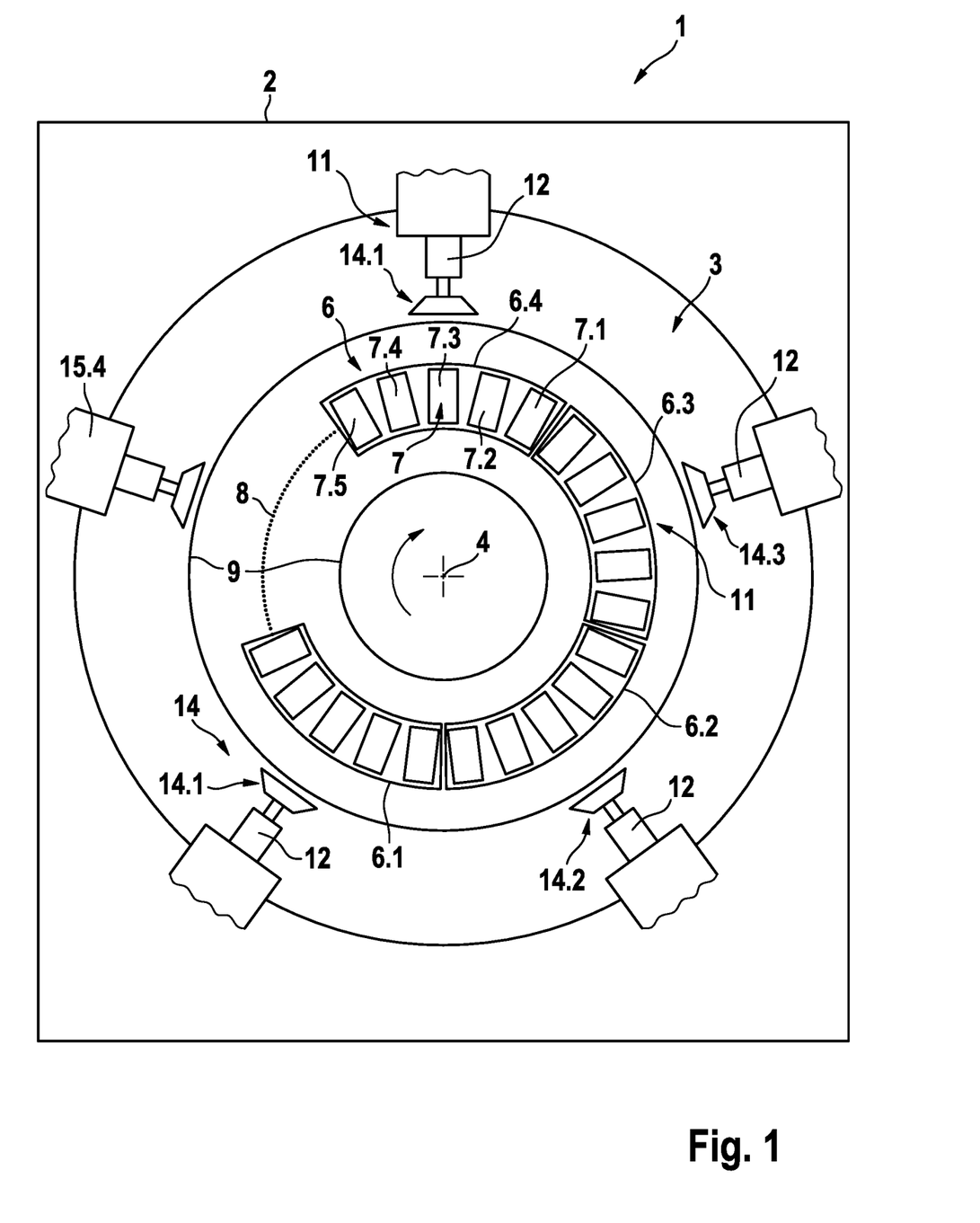
FIG. 1 is a highly simplified schematic plan view of an embodiment of a transport device according to the invention.
Figure 2:
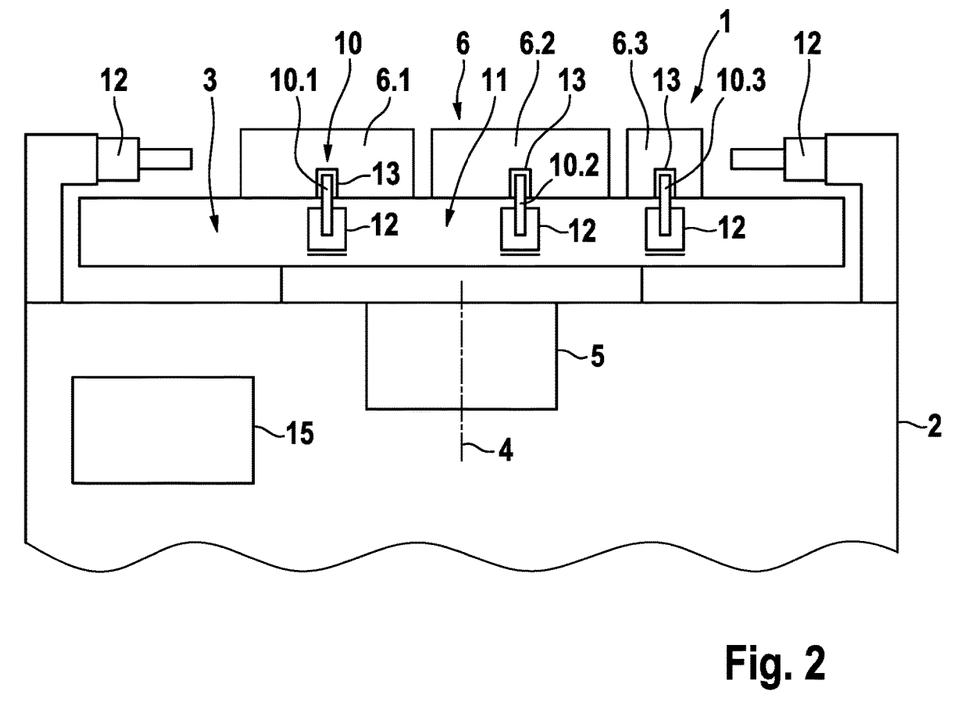
FIG. 2 is a schematic sectional view of the transport device according to the invention.

FIGS. 1 and 2 are a highly simplified schematic plan view (FIG. 1) and side view (FIG. 2) of an embodiment of the transport device according to the invention. The figures only show the components of the transport device that are essential to the invention. The figures are merely for illustrative purposes. The size ratios between the individual components do not necessarily correspond to the actual ratios.

In the present embodiment, the transport device is in the form of a rotary indexing table. The rotary indexing table 1 comprises a housing 2 that receives an object carrier 3 that can turn about a vertical axis of rotation 4 of a drive unit 5. In FIGS. 3 to 10, the vertical axis of rotation 4 is perpendicular to the image plane. The drive unit 5 turns the object carrier 3 in steps in successive cycles through a fixed angle of rotation.

The object carrier 3 receives a plurality of object carrier elements. In the present embodiment, the object carrier 3 receives the object carrier elements 6.1, 6.2, 6.3, 6.4. The object carrier elements 6 each comprise a plurality of receiving elements 7. In the present embodiment, the object carrier elements 6 each comprise five receiving elements 7.1, 7.2, 7.3, 7.4, 7.5. Each receiving element can receive one object. However, each object carrier element 6 can also comprise just one receiving element, it also being possible for a receiving element 7 to also receive a plurality of objects. The receiving elements could, for example, be trays, stands, holders or the like.

The object carrier elements 6 are distributed circumferentially on the object carrier 3. Each element delineates the shape of a segment of a circle. When the object carrier turns, for example clockwise, as indicated by an arrow, the carrier elements 6 can move on a circular movement path 8. However, the object carrier elements 6 are not rigidly connected to the object carrier 3, but rather are displaceably guided in the direction of the circular path 8 in a guide 9, which is only shown schematically. Therefore, if the object carrier elements 6 are held in place externally, the object carrier 3 can turn without the object carrier elements being carried along therewith.

In the present embodiment, the individual carrier elements 6 each have a circumferential angle of $360°/5 = 72°$. Since just four object carrier elements 6.1, 6.2, 6.3, 6.4 are provided, one portion of the circular movement path 8 remains empty. This gap allows the object carrier elements 6 to be displaced relative to the object carrier 3 without the object carrier elements obstructing one another. The number of object carrier elements 6 and the circumferential angle of the object carrier elements 6 are determined by the arrangement and number of work stations.

In the present embodiment, which is described in detail below with reference to FIGS. 3 to 9, the transport device is a part of a production facility that has four work stations. The work stations are not shown in FIGS. 1 and 2. They are distributed circumferentially around the object carrier 3 of the rotary indexing table 1.

The transport device also has a plurality of dog elements. In the present embodiment, all the object carrier elements 6 are displaceably guided. Therefore, each object carrier element 6.1, 6.2, 6.3, 6.4 is assigned a dog element 10. FIG. 2 only shows three dog elements 10.1, 10.2, 10.3. All the dog elements are actuated by an actuation unit, which comprises actuation members 12 assigned to the individual dog elements. In FIGS. 1 and 2, the actuation unit in the form of a device comprising the actuation members 12 is denoted by reference numeral 11. The actuation members 12 can, for example, comprise electrical, magnetic, electromagnetic, pneumatic or hydraulic drives.

In the present embodiment, the dog elements 10 are pins that engage in recesses 13 in the object carrier elements 6. The dog elements 10 can be actuated by the actuation members 12 of the actuation unit 11 in such a way that said elements assume a state in which they engage in a recess 13 in an object carrier element 6 or are retracted from the recess. As a result, the object carrier elements 6 can be secured on the object carrier 3. The actuation members 12 can be actuated independently of one another by the actuation unit 11. The object carrier elements 6 can be locked independently of one another.

In addition, the transport device comprises a plurality of retaining elements 14. In the present embodiment, each object carrier element 6 is assigned a retaining element 14.1, 14.2, 14.3, 14.4, (14.5). The retaining elements 14 are actuated by the actuation members 12 of the actuation unit 11. The actuation members 12 for the retaining elements can, for example, comprise electrical, magnetic, electromagnetic, pneumatic or hydraulic drives. The retaining elements 14 are distributed circumferentially around the object carrier 3. Unlike the catch elements 10, the retaining elements do not move together with the object carrier 3, but instead are rigidly connected to the housing 2 of the transport device. The retaining elements 14 can, for example, be pressure pistons that are displaceable in the longitudinal direction and are pushed onto the outer circumferential surfaces of the object carrier elements 6 such that the object carrier elements are held in place externally. Alternatively, the retaining elements 14 can, for example, act in the movement path of the object carrier elements such that the object carrier elements are held in place externally.

In addition, the transport device has a control unit 15 for the actuation unit 11. The control unit 15 can be a freely programmable control unit by which the individual actuation members 12 of the actuation unit 11 can be activated independently of one another at certain times, such that the dog and retaining elements 10, 14 are actuated.

The control unit 15 is designed such that, in some cycles, the dog element 10 assigned to one object carrier element 6 assumes an active state and the retaining element 14 assigned to the object carrier element assumes an inactive state such that the object carrier element 6 is carried along by the object carrier 3 and moved from work station to work station. The control unit 15 is also designed such that, in some cycles, the dog element 10 assigned to the object carrier element 6 assumes an inactive state and the retaining element 14 assumes an active state such that the object carrier element remains at a work station.

FIGS. 3 to 9 show the individual work steps of a method for producing a product. In the present embodiment, the production method is a method for producing containers filled with a medical product, in particular for producing bags filled with a medical solution, in particular film bags for peritoneal dialysis. FIGS. 3 to 9 are merely used to illustrate the basic principle of the method. Therefore, not every method step required to produce the product is shown.

Figure 3:
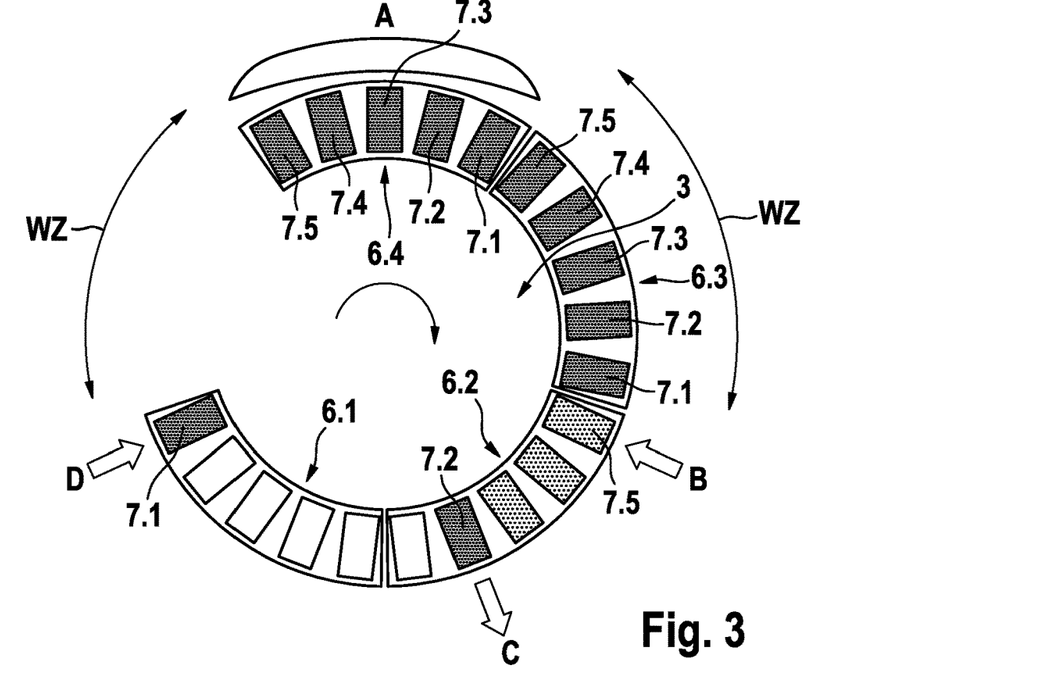
FIG. 3 is a schematic sectional illustration of the first work step of a method for producing products using the transport device according to the invention.

The production facility comprises at least one transport device described with reference to FIGS. 1 and 2. FIG. 3 schematically shows just the four object carrier elements 6.1, 6.2, 6.3, 6.4 of the transport device (rotary table). In the present embodiment, the production facility comprises four work stations A, B, C, D (only shown by way of indication) that are distributed circumferentially around the object carrier 3. The containers, in particular film bags, are provided as blanks that are not provided with a connection piece, in particular a welded shuttle, and are not filled with the medical product, in particular a fluid, for example a solution for peritoneal dialysis. The work station A is a filling station, by which the bags provided with the connection piece are filled. Filling the bags is a work process having a long process time. The process time is considerably longer than the process time of the other work stations. The work station B having a short process time is a work station by which the bag blanks are fitted with the connection pieces. The work station C is a work station for removing the bags that have been provided with the connection piece and filled, and the work station D is a work station for setting down the bag blanks. The work stations B, C, D have a process time that is shorter than the process time of work station A.

The drive unit 5 turns the object carrier 3 in steps clockwise in successive short or long cycles. In the present embodiment, the object carrier 3 is turned clockwise in a short cycle through 14.4° (360°/5 (five carrier elements)/5 (five receiving elements 7.1, 7.2, 7.3, 7.4, 7.5 per carrier element=14.4°. The dog elements 10 and retaining elements 14 (FIGS. 1 and 2) are not shown in FIGS. 3 to 9.

The described method is distinguished by a combination of single cycles for the work stations B, C, D having short process times and multiple cycles for the work station A having the long process time. For this purpose, the single cycles have to be collected upstream of the work station A having the long process time and the multiple cycle has to be collected downstream of the work station A having the long process time. The single cycles and the multiple cycle are collected in waiting areas WZ in the direction of rotation (clockwise) upstream and downstream of the work station A having the long process time. In the following, the individual work steps will be described.

FIG. 3 shows the first work step (starting position). The four object carrier elements 6.1, 6.2, 6.3, 6.4 are arranged such that, in the first work step, there are no object carrier elements in the waiting area WZ upstream of the work station A having the long process time. The bag blanks are located in the receiving elements 7.1, 7.2, 7.3, 7.4, 7.5 of the third and fourth object carrier element 6.3, 6.4. The waiting area WZ upstream of the work station A having the long process time is empty and the waiting area WZ downstream of the work station A is full. The work station A for the filling process having the long process time and the work stations B, C, D for the work processes having the short work times are all in operation. The work station B fits a connection piece, for example a cover cap, to the filled bag located in the fifth receiving element 7.5 of the second object carrier element 6.2. The work station C removes the finished bag that is located in the second receiving element 7.2 of the second object carrier element 6.2 and has been provided with the connection piece and filled with the solution, and the work station D puts a bag blank in the first receiving element 7.1 of the first object carrier element 6.1.

Figure 4:
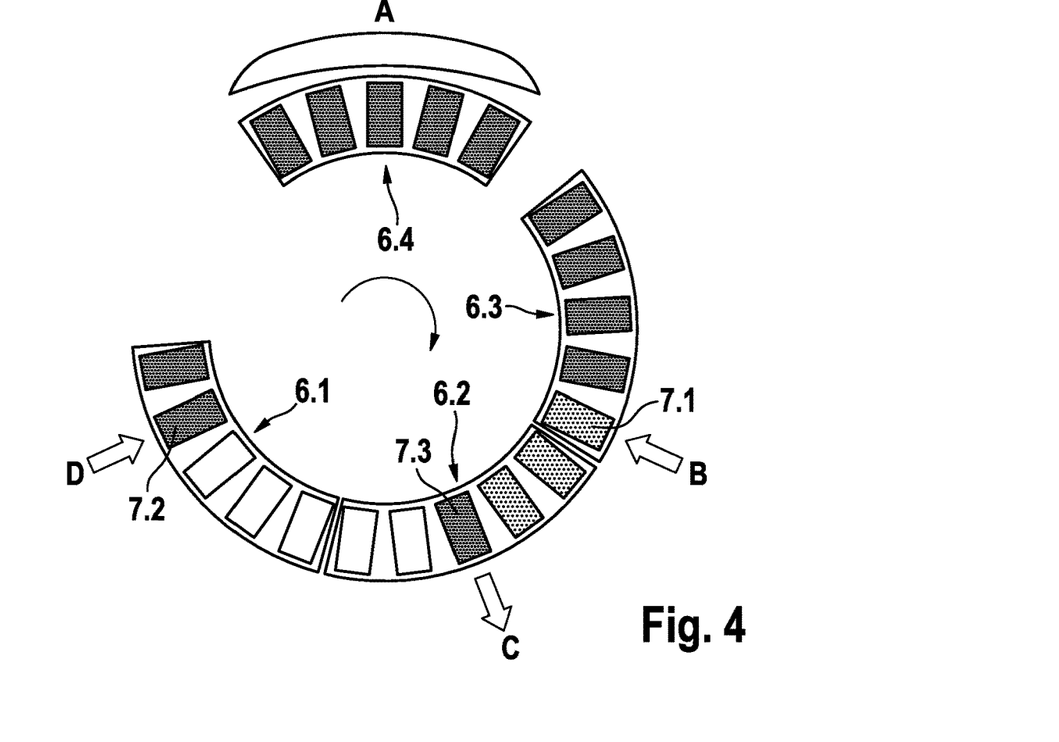
FIG. 4 is a schematic sectional illustration of the second work step of the production method.
Figure 5:
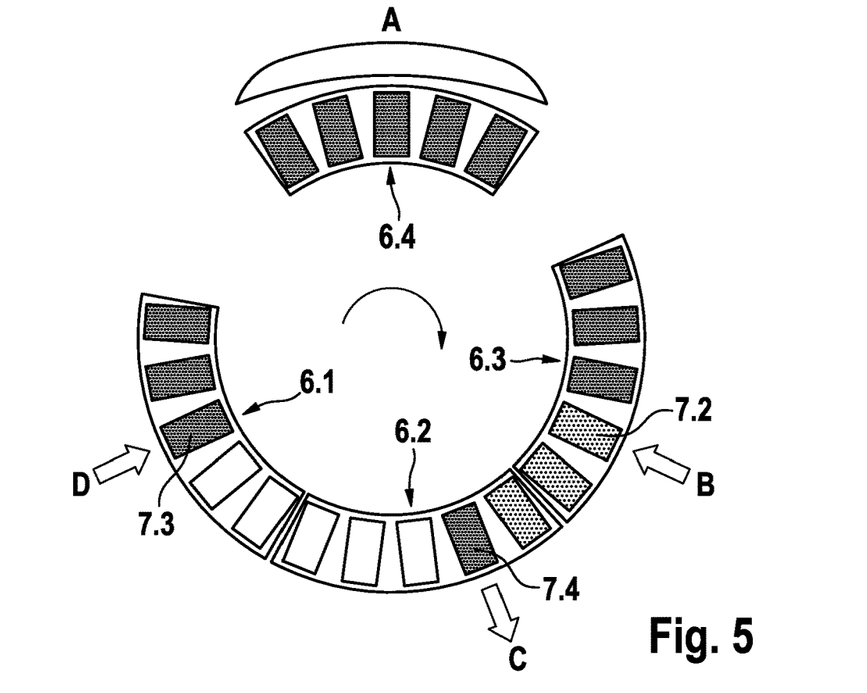
FIG. 5 is a schematic sectional illustration of the third work step of the method.
Figure 6:
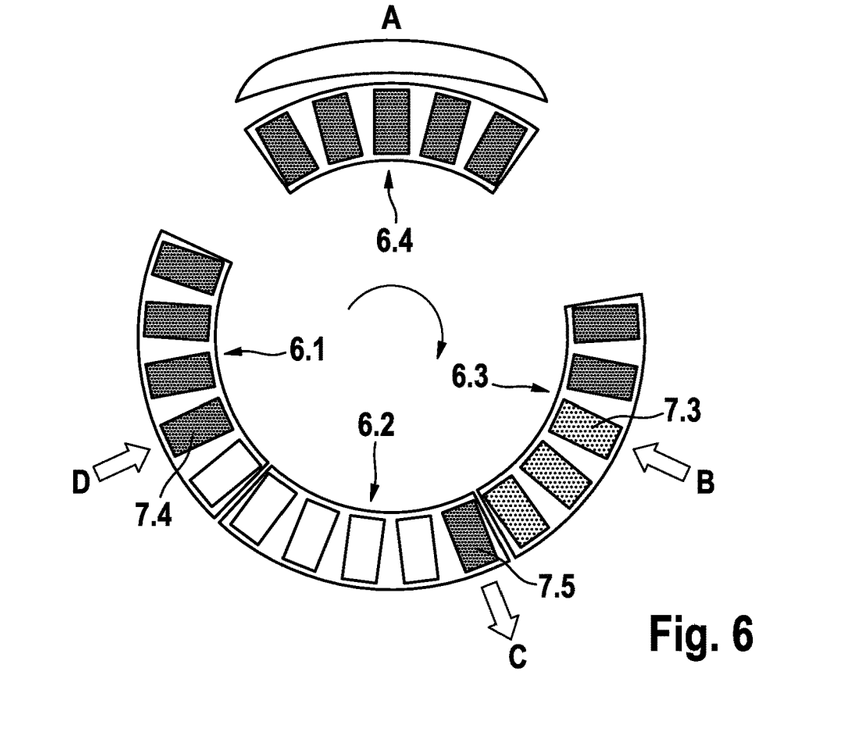
FIG. 6 is a schematic sectional illustration of the fourth work step of the method.
Figure 7:
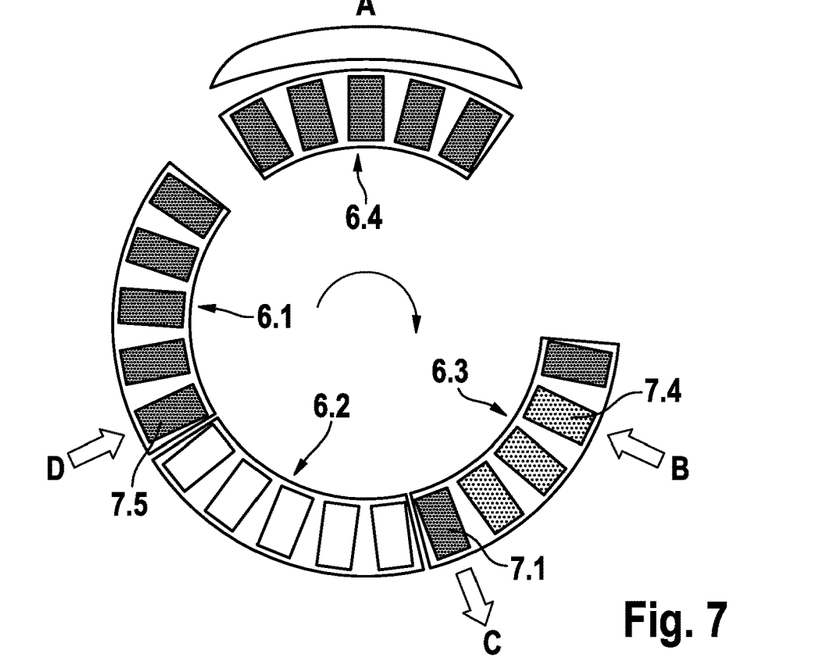
FIG. 7 is a schematic sectional illustration of the fifth work step of the method.
Figure 8:
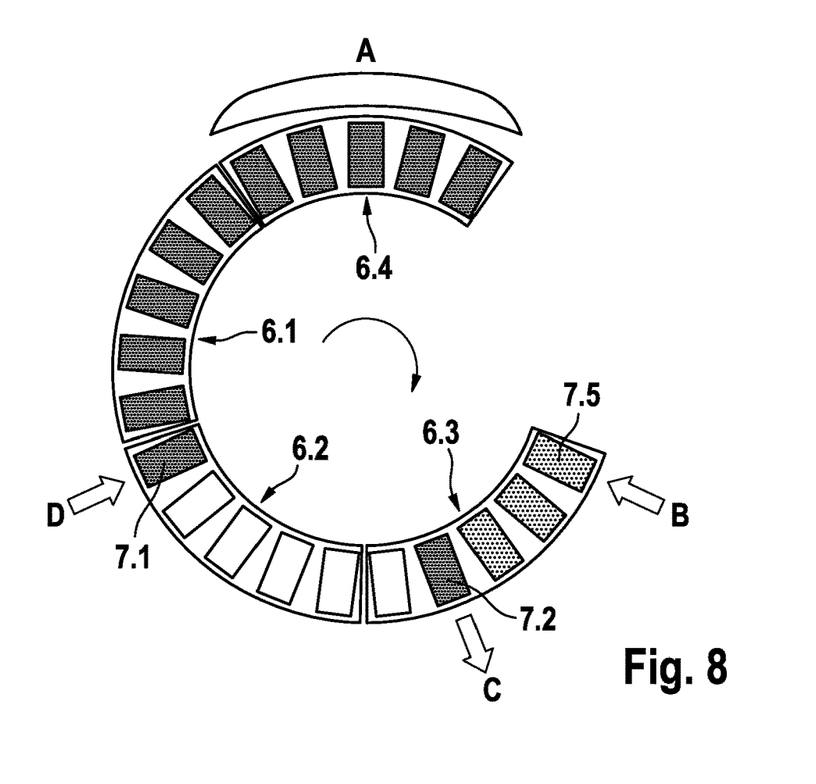
FIG. 8 is a schematic sectional illustration of a small cycle of the sixth work step of the method.
Figure 9:
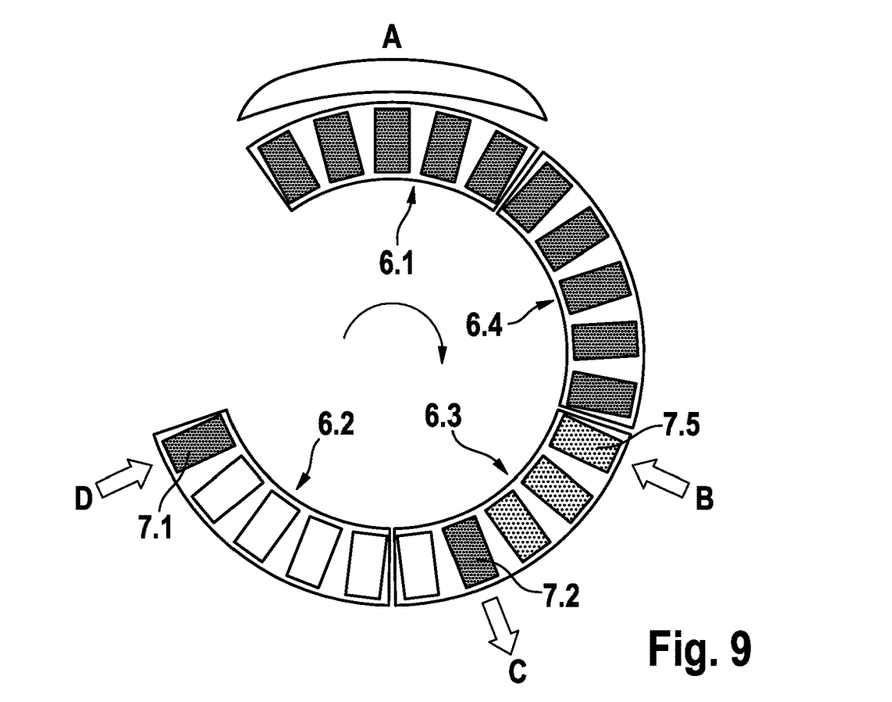
FIG. 9 is a schematic sectional illustration of a large cycle of the sixth work step of the method.

FIG. 4 shows the second work step. The control unit 15 activates the actuation unit 11 such that the dog elements 10 assigned to the first, second and third object carrier elements 6.1, 6.2, 6.3 are active and the retaining elements 14 assigned to said object carrier elements are inactive, while the dog element 10 assigned to the fourth object carrier element 6.4 is inactive and the retaining element 14 assigned to said object carrier element is active. As a result, the first, second and third object carrier elements 6.1, 6.2, 6.3 are carried along when the object carrier 3 turns clockwise, and the fourth object carrier element 6.4 is held in place. After the object carrier 3 has turned through a predetermined angle of rotation) (14.4°), the waiting area WZ upstream of the long process contains just one bag blank, and the waiting area WZ downstream of the long process is occupied by four filled bags. The work station B fits a connection piece to the filled bag located in the first receiving element 7.1 of the third object carrier element 6.3. The work station C removes the finished bag that is located in the third receiving element 7.3 of the second object carrier element 6.2 and has been provided with the connection piece and filled with the solution, and the work station D places a bag blank in the second receiving element 7.2 of the first object carrier element 6.1.

In the third work step (FIG. 5), the control unit 15 reactivates the actuation unit 11 such that the first, second and third object carrier elements 6.1, 6.2, 6.3 are carried along and the fourth object carrier element 6.4 is held in place. The object carrier 3 turns again through a predetermined angle of rotation) (14.4°). After the object carrier 3 has turned, the waiting area WZ upstream of the long process contains two bag blanks, and the waiting area downstream of the long process is occupied by three filled bags. The work station B now fits a connection piece to the filled bag located in the second receiving element 7.2 of the third object carrier element 6.3. The work station C removes the finished bag from the fourth receiving element 7.4 of the second object carrier element 6.2 and the work station D puts a bag blank in the third receiving element 7.3 of the first object carrier element 6.1.

In the fourth step (FIG. 6), the first, second and third object carrier elements 6.1, 6.2, 6.3 are once again carried along, while the fourth object carrier element 6.4 is held in place. After the object carrier has turned through the predetermined angle of rotation) (14.4°), the waiting area WZ upstream of the long process contains three bag blanks, and the waiting area WZ downstream of the long process is occupied by two filled bags. The work station B fits a connection piece to the filled bag located in the third receiving element 7.3 of the third object carrier element 6.3, the work station B removes the finished bag from the fifth receiving element 7.5 of the second object carrier element 6.2, and the work station D puts a bag blank in the fourth receiving element 7.4 of the first object carrier element 6.1.

In the fifth step (FIG. 7), the first, second and third object carrier elements 6.1, 6.2, 6.3 are carried along, while the fourth object carrier element 6.4 is held in place. After the object carrier 3 has turned through the predetermined angle of rotation) (14.4°), the waiting area WZ upstream of the long process contains four bag blanks, and the waiting area WZ downstream of the long process is occupied by one filled bag. The connection piece is fitted to the filled bag located in the fourth receiving element 7.4 of the third object carrier element 6.3, the finished bag located in the first receiving element 7.1 of the third object carrier element 6.3 is removed, and a bag blank is put in the fifth receiving element 7.5 of the first object carrier element 6.1.

Next comes the sixth work step, which includes a small cycle (FIG. 8) in which the object carrier rotates through an angle of rotation of 14.4°, and a large cycle (FIG. 9) in which the object carrier 3 rotates through an angle of rotation of 72° (5*14.4°=72°). In the small cycle, the first, second and third object carrier elements 6.1, 6.2, 6.3 are carried along, and the fourth object carrier element 6.4 is held in place. After the object carrier has rotated through 14.4° (small cycle), the waiting area WZ upstream of the long process is full and the waiting area WZ downstream of the long process is empty. A connection piece is fitted to the filled bag located in the fifth receiving element 7.5 of the third object carrier element 6.3, the finished bag is removed from the second receiving element 7.2 of the third object carrier element 6.1, and a bag blank is put in the first receiving element 7.1 of the second object carrier element 6.2.

In the large cycle (FIG. 9) of the sixth work step following the small cycle, the control unit 15 activates the actuation unit 11 such that the first and fourth object carrier elements 6.1, 6.4 are carried along and the second and third object carrier elements 6.2, 6.3 are held in place. In the large cycle, the object carrier 3 turns through 72° (5*14.4°=72°). After the object carrier 3 has turned, the waiting area WZ upstream of the long process is empty and the waiting area WZ downstream of the long process is full, and so the first work step (FIG. 3) can come next again.

In the sixth work step, the sum of the cycle time of the small cycle $t_{TK}$ and the cycle time of the long cycle $t_{TL}$ is smaller than the overall process time of the short cycle $t_{GK}$ ($t_{TK}+t_{TL}<t_{GK}$).

The above-described process corresponds to a five-fold parallel operation of the longest process.

When designing the production facility, the following laws arise:

$t_{PK}$ process time of the short process
$t_{PL}$ process time of the long process
$t_{TK}$ cycle time of the short cycle
$t_{TL}$ cycle time of the long cycle
$t_{GK}$ overall process time of the short cycle
$t_{GL}$ overall process time of the long cycle
S scaling factor
WZ waiting area
$A_{OTE}$ number of object carrier elements
$A_{WZ}$ number of waiting areas
LP process having the long process time
KP process having the short process time
Overall process time of the short cycle:

$$t_{GK}=t_{PK}+t_{TK}$$

The short and long cycles must be within the cycle time of the short cycle:

$$t_{TK}+t_{TL}<t_{GK}$$

Overall process time of the long cycle:

$$t_{GL}=t_{PL}+t_{LK}$$

Calculation of the necessary multiplication of the longest processing step:

$$t_{GL}/t_{GK}=S$$

Depending on which facility part is set to be the bottleneck of the overall system, S has to be rounded up or down.

The number of coupled object carriers per segment:

$$S*\text{object carrier}=\text{object carrier element}$$

Number of object carrier elements per system:

$$A_{OTE}\geq 2(1\times\text{short process, }1\times\text{long process})$$

Number of WZ per system:

$A_{WZ}\geq 2$ (WZ necessary per change from short process to long process, WZ necessary per change from long process to short process)

Figure 10:
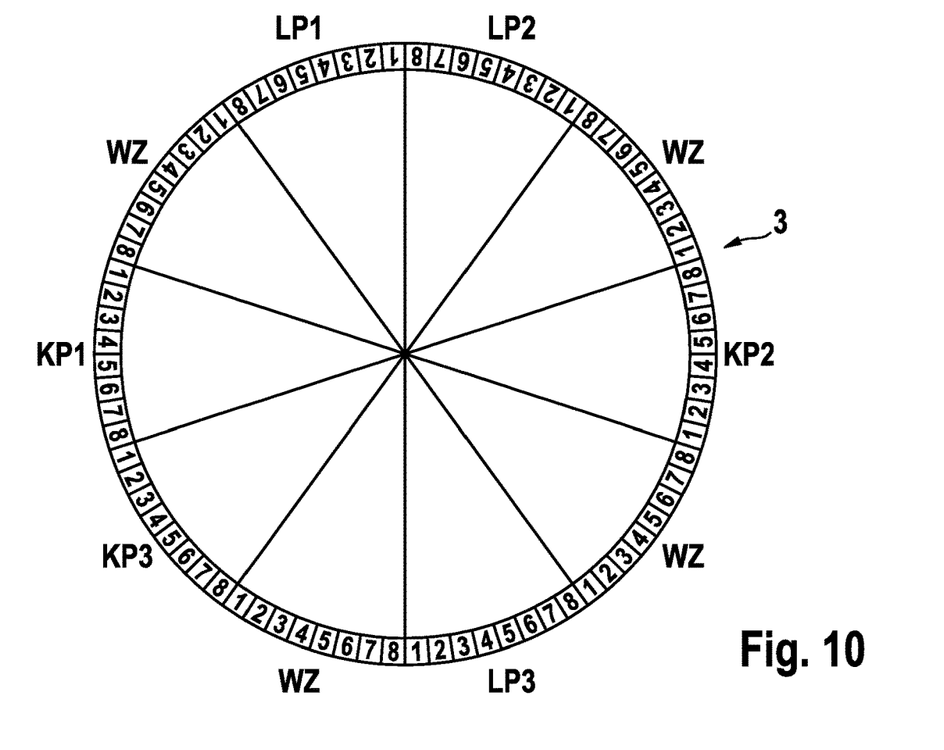
FIG. 10 is a highly simplified schematic view of a second embodiment of an object carrier of the transport device according to the invention.

For illustrative purposes, FIG. 10 shows a second embodiment of a work process, for example for processing small parts. The object carrier 3 has ten possible positions, resulting in ten dog elements 10 and ten retaining elements 14. In the present embodiment, the result is four waiting areas, two changes taking place from short to long process and two from long to short process. In FIG. 10, the processes having the long process time are denoted by LP1, LP2, LP3, while the processes having the short process time are denoted by KP1, KP2, KP3. Each object carrier element has eight receiving elements, which are numbered 1 to 8 in FIG. 10.

The invention claimed is:

1. A transport device for transporting objects from work station to work station of a production facility, comprising
   an object carrier on which a plurality of object carrier elements are arranged for placing down one or more objects, the object carrier being able to move in successive cycles such that the object carrier elements are transportable on a movement path from work station to work station, and
   a drive unit for driving the object carrier,
   wherein
   at least one object carrier element of the plurality of object carrier elements on the object carrier is arranged to be displaceable relative to the object carrier in the direction of the movement path on which the object carrier elements are transportable from work station to work station,
   the at least object carrier element is assigned a dog element that that is capable of moving together with the object carrier and capable of moving between an active state, in which relative movement between the at least one object carrier element and the object carrier is prevented, and an inactive state, in which relative movement between the at least one object carrier element and the object carrier is permitted, and
   the at least one object carrier element is assigned a stationary retaining element that is movable between an active state, in which the at least one object carrier element is held in place, and an inactive state, in which the at least one object carrier element is released,
   an actuation unit that actuates the dog element and the stationary retaining element is provided and a control unit for the actuation unit is provided, the control unit is configured such that, in some cycles of the successive cycles, the dog element assumes an active state and the stationary retaining element assumes an inactive state such that the at least one object carrier element is carried along by the object carrier and moved from said work station to work station, and, in some cycles of the successive cycles, the dog element assumes an inactive state and the stationary retaining element assumes an active state such that the at least one object carrier element remains at a work station.

2. The transport device according to claim 1, wherein all of the at least one object carrier element of the plurality of object carrier elements on the object carrier are arranged to be displaceable relative to the object carrier in the direction of the movement path on which the object carrier elements are transportable from said work station to work station, in that each of the at least one object carrier element is assigned a dog element that is capable of moving together with the object carrier, in that each of the at least one object carrier element is assigned a stationary retaining element, and in that the actuation unit is configured such that, in some cycles of the successive cycles, at least one of the dog element assumes an active state and at least one of the stationary retaining element assumes an inactive state such that at least one object carrier element is carried along by the object carrier and moved from said work station to work station, and, in some cycles of the successive cycles, at least one of the dog element assumes an inactive state and at least one of the stationary retaining element assumes an active state such that at least one object carrier element remains at said work station.

3. The transport device according to claim 1, wherein the transport device is in the form of a rotary indexing table comprising the object carrier that is turnable about an axis of rotation, the movement path on which the object carrier elements can be transported from the work station to work station being a circular path.

4. The transport device according to claim 3, wherein the object carrier elements are distributed circumferentially on the circular path, one segment of the circular path not having the at least one object carrier element or one segment of the circular path not having the plurality of object carrier elements.

5. The transport device according to claim 1, wherein the object carrier comprises a guide path in which the object carrier elements are guided in a freely movable manner.

6. The transport device according to claim 1, wherein the object carrier elements comprise a plurality of receiving elements which are each configured to receive an object.

7. The transport device according to claim 1, wherein the dog element is configured such that an interlocking and/or frictional connection can be established between a part of the object carrier element and a part of the object carrier.

8. The transport device according to claim 1, wherein the stationary retaining element is configured such that an interlocking and/or frictional connection can be established between a part of the object carrier element and a stationary part.

9. A production facility for producing products, comprising the transport device for transporting objects according to claim 1, wherein a plurality of work stations is provided, each work station configured to carry out at least one work process, which includes at least one work step, on at least one product arranged on said object carrier element.

10. The production facility according to claim 9, wherein at least one work station of the plurality of work stations is a work station for carrying out a work process having a process time that is longer than the process times of the other work stations.

11. The production facility for producing containers filled with a medical product according to claim 9, wherein the work station having the longer process time is a work station for filling the containers with the medical product, and the other work stations having the shorter process times are a work station for setting down unfilled containers that are to be provided with a connection piece, a work station for attaching the connection piece to the containers, and a work station for removing the containers that have been provided with the connection piece and filled with the medical product.

* * * * *